United States Patent
Turban

(10) Patent No.: US 6,700,900 B1
(45) Date of Patent: Mar. 2, 2004

(54) TRANSPORT OF CONCATENATED CONTAINERS IN A SYNCHRONOUS INFORMATION TRANSMISSION NETWORK

(75) Inventor: Karl-Albert Turban, Leonberg-Höfingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/559,187

(22) Filed: Apr. 27, 2000

(30) Foreign Application Priority Data

Apr. 29, 1999 (DE) .......................... 199 19 768
Nov. 30, 1999 (DE) .......................... 199 57 577

(51) Int. Cl.$^7$ ................................ H04J 3/22
(52) U.S. Cl. ............................ 370/465; 370/393
(58) Field of Search .................... 370/230, 353, 370/354, 355, 465, 466, 470, 485, 487, 505, 529, 258, 222, 462

(56) References Cited

U.S. PATENT DOCUMENTS

| | | | | |
|---|---|---|---|---|
| 5,857,092 A | * | 1/1999 | Nakamura et al. ............. 710/62 |
| 6,011,802 A | * | 1/2000 | Norman .................... 370/466 |
| 6,014,708 A | * | 1/2000 | Klish ...................... 709/232 |
| 6,058,119 A | * | 5/2000 | Engbersen et al. ......... 370/466 |
| 6,094,440 A | * | 7/2000 | Sugawara et al. .......... 370/465 |
| 6,188,685 B1 | * | 2/2001 | Wolf et al. ................ 370/378 |
| 6,339,628 B1 | * | 1/2002 | Yoshida ..................... 375/376 |
| 6,477,178 B1 | * | 11/2002 | Wakim et al. .............. 370/466 |
| 6,496,519 B1 | * | 12/2002 | Russell et al. .............. 370/465 |
| 6,556,593 B1 | * | 4/2003 | Herkersdorf et al. ........ 370/532 |
| 6,577,651 B2 | * | 6/2003 | Singh et al. ................ 370/509 |
| 6,584,118 B1 | * | 6/2003 | Russell et al. .............. 370/466 |
| 6,603,776 B1 | * | 8/2003 | Fedders et al. ............. 370/476 |

* cited by examiner

*Primary Examiner*—Douglas Olms
*Assistant Examiner*—Van Nguyen
(74) *Attorney, Agent, or Firm*—Sughrue Mion, PLLC

(57) ABSTRACT

According to the ITU recommendations for SDH or SONET, a payload exceeding the transmission capacity of the largest virtual container can be divided over several concatenated virtual containers. According to a method for the transmission of such a payload via a synchronous information transmission network (NET), the payload is divided into blocks and the individual blocks are packed into virtual containers (VC4), each of which has a path overhead and a payload field, and are transported as a virtual concatenation in at least one transport module. A pointer (Z) that points to the next virtual container in the concatenation is inserted in the path overhead of all virtual containers (VC4) except the last virtual container in the concatenation. This makes it possible to change the number of concatenated virtual containers (VC4) during a connection.

12 Claims, 1 Drawing Sheet

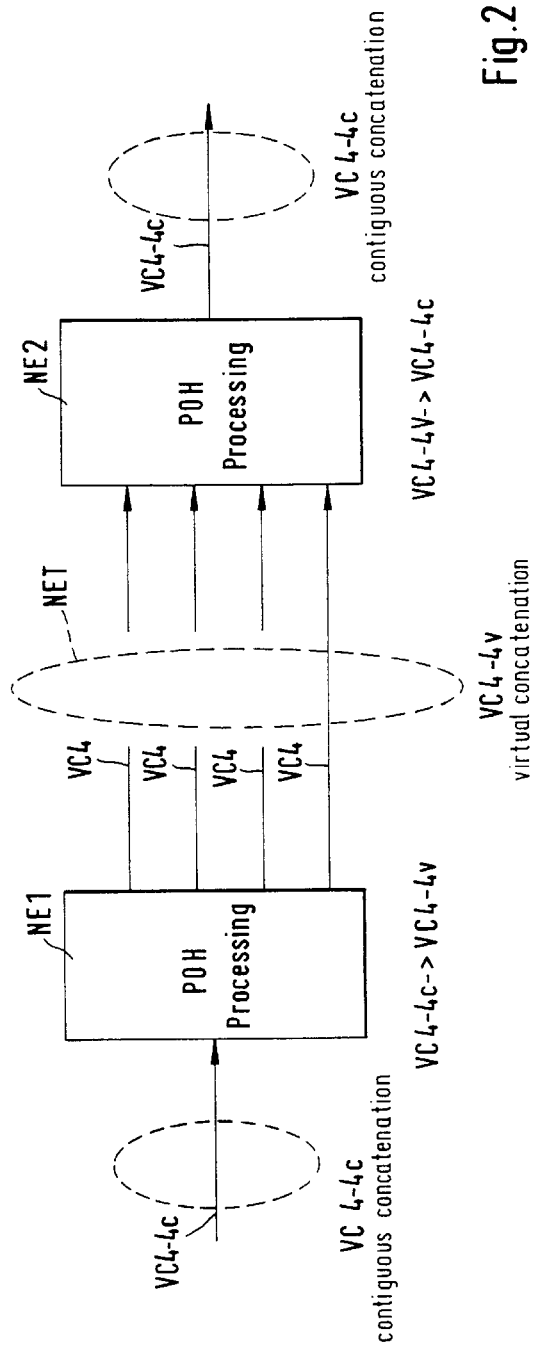

TRANSPORT OF CONCATENATED CONTAINERS IN A SYNCHRONOUS INFORMATION TRANSMISSION NETWORK

The invention relates to a method and an apparatus for transporting a payload in a synchronous information transmission network in the form of concatenated virtual containers.

In a synchronous information transmission network that operates according to the ITU-T recommendations for synchronous digital hierarchy (SDH) or for Synchronous Optical Network (SONET), payload signals are transmitted within a frame structure, whose frames are referred to as synchronous transport modules. The basic unit is the STM-1 transport module. Larger transport modules of the STM-4, STM-16 or STM-64 type are created by nesting the bytes of several (4, 16 or 64) STM-1. The transport modules contain one or several virtual containers, which contain the payload to be transported. The largest virtual container with a transmission capacity of 145 Mbit/sec is the VC-4. A payload that is larger than the capacity of the VC-4 can be transmitted in the form of linked or concatenated containers. This means that the payload signal is divided into blocks, each of which is transported in a VC-4, and that the concatenation guarantees that the blocks at the other end of the transport network can be reassembled into their original sequence with the correct phase relationship.

There are two forms of concatenation, namely virtual concatenation and contiguous concatenation. The two forms should furthermore be capable of being converted one into the other. The present invention primarily relates to the first form of concatenation, virtual concatenation, but also relates to how the two forms of concatenation can be advantageously converted one into the other. In contiguous concatenation, the concatenated containers are transmitted as a unit in a relatively large transport module, for example STM-4, and only the path overhead of the first of the concatenated VCs is evaluated. In virtual concatenation the concatenated containers are transmitted independent of one another and are not reassembled into the original phase relationship and sequence until the end of the transmission path. Usually, concatenation is first created based on contiguous concatenation and then transformed into a concatenation based on virtual concatenation.

The prior art proposals provide that all functions of the virtual concatenation be administered by a management system ("network manager"). A further proposal provides that the virtual containers contain an identifier called the TTI (Trail Trace Identifier). This identifier is contained in the JI-byte of the path overhead in each virtual container, indicates the source of the respective virtual container, and is normally assigned by the network management system. According to this further proposal, all virtual containers that are concatenated by means of virtual concatenation should receive the same identifier. However, in previous practice all virtual containers have received different identifiers. Prior art solutions proposed for the concatenation of virtual containers have the following disadvantages:

The number of concatenated containers cannot be changed during a connection, since the change in the number of concatenated containers would have to take place synchronously in all network nodes. The network manager does not guarantee this a priori.

The sequence in which the containers are transmitted in the multiplex structure must be administered.

The identification of the individual containers within a concatenation is not precisely described.

If containers arrive in the wrong sequence, misleading alarms are produced according to prior art specifications.

Today's network management systems are not prepared to properly handle several containers with identical TTIs.

The object of the present invention is to present a method for transmitting a payload in the form of concatenated containers, which can be used variably and which overcomes the disadvantages of prior art solutions. In particular, it is the object of the present invention to present a method in which the number of concatenated containers can be changed during transmission. A further object is to present a network element to implement this method.

In terms of the method this object is attained by the features of Claim 1 and in terms of the network element by the features of Claim 10. Advantageous embodiments are presented in the dependent claims.

The present invention has the following advantages:

A virtual concatenation does not require management of variable capacity for the duration of a connection.

The virtual containers can be transmitted in the multiplex structure (STM-N) in any sequence. According to the method proposed in the present invention, the containers are automatically resorted at the other end of the transmission path.

Only those network nodes in which a conversion from virtual concatenation to contiguous concatenation and vice versa takes place have to be retrofitted.

All of the virtual containers (VC) belonging to a virtual concatenation can be unambiguously identified.

A plurality of virtual containers can be transmitted within a multiplex structure (STM-N) without the risk of confusing the virtual containers.

The present invention is explained in detail below on the basis of an embodiment shown in FIG. 1 and FIG. 2, in which:

FIG. 1 shows an H4 multiframe in which the sequence number is inserted and

FIG. 2 shows the conversion from virtual concatenation to contiguous concatenation using the example of the VC-4-4 (c/v).

Each virtual container represents a logical link in the information transmission network. For this reason each container is assigned its own TTI by the network management system. In contrast, concatenated containers in a contiguous concatenation represent only one single logical link in the information transmission network.

In contiguous concatenation, all containers that are linked to one another have only a single TTI, since only the path overhead of the first container is evaluated. When converting from contiguous to virtual concatenation, however, all VC4s must now be assigned a TTI. In principle there are two possibilities: either all of the concatenated VC4s receive the same TTI or predetermined TTIs are used, which for example are selected according to a predetermined creation rule, or which are taken from a table administered by the management system. In accordance with the present invention, either of these possibilities can be used.

One of the basic concepts of the present invention is to insert in addition a pointer in the path overhead of the concatenated virtual containers, which points to the next container in the concatenation.

To this end, a sequence number is inserted in the H4 byte in the POH (path overhead)). In addition, the sequence number of the next VC4s is inserted in each of the concatenated containers. In this way, the sequence in which the VC4s are concatenated is clearly defined.

The TTI contained in the J1 byte together with the sequence number in the H4 byte can be seen as a "new" TTI, i.e. as the TTI that has been supplemented by the sequence number contained in the H4 byte.

Thus, if four virtual containers VC-4 are linked together, they are assigned, for example, the sequence numbers 1 to 4. Advantageously a frame number can be inserted in addition. This number is counted up with each transmitted frame. Therefore according to the sequence, the frames with the sequence number 1–4 and the frame number 1 come first, then the frames with the sequence number 1–4 and the frame number 2, and so on . . . The respective first and last container of the concatenation can in addition be marked as the first and last container.

The pointer to the next container makes it possible to change the number of the containers during the connection. This allows for variable bandwidth adjustment.

The exemplary embodiment thus provides for the following measures:

All VCs of a virtual concatenation receive the same or a known TTI.

The suggested sequence numbers and a frame number are transmitted in the bytes of the H4 multiframe.

In addition, the substitute bytes in the H4 multiframe have identifiers for:

The first VC-4 in the virtual concatenation,

The TTI of the next VC-4,

The last VC-4 in the virtual concatenation,

The insertion of a VC-4 in the existing virtual concatenation and

The removal of a VC-4 from the existing virtual concatenation.

This implementation allows the capacity to be adjusted without further signaling through the evaluation of the TTI and the H4 multiframes. If one or the other of the VC-4s in the SDH multiplex structure does not contain a payload—often also referred to as useful information—this transmission capacity can be filled with extra traffic. In virtual concatenation this means that if one of the concatenated containers does not contain a useful signal block, this container is removed from the concatenation, in that the sequence number of the next container is inserted in the preceding container.

FIG. 1 is a diagram of an H4 multiframe. This multiframe consists of a sequential series of H4 bytes H4 of temporally sequential containers, i.e. the H4 byte of the same container is reconsidered frame by frame. The numbers 1 through 16 are inserted in the first line of the multiframe. The second column shows the contents of the corresponding H4 byte. From a temporal point of view, the H4 byte thus contains the sequence number S in the first frame, the consecutive frame number F in the second frame, the mark M for the first or last container of the concatenation in the third frame, and the expanded TTI as the pointer Z pointing to the next container, i.e. the sequence number of the next following container in the concatenation, in the fourth frame. The remaining twelve fields of the H4 multiframe are not used in the present embodiment (n.d.: not defined).

The use of the "first/last" field in a virtual concatenation of n containers is shown in Table 1.

TABLE 1

| | Bit 0 | Bit 1 | Bit 2 | Bit 3 | Bit 4 | Bit 5 | Bit 6 | Bit 7 |
|---|---|---|---|---|---|---|---|---|
| First VC4 in the virtual concatenation | ID#0 | ID#1 | ID#2 | ID#3 | 0 | 0 | 0 | 0 |
| Second to the (n-1)th VC4 | ID#0 | ID#1 | ID#2 | ID#3 | 0 | 1 | 0 | 1 |
| Insertion of a VC4 in the next multiframe | ID#0 | ID#1 | ID#2 | ID#3 | 1 | 1 | 0 | 0 |
| Removal of a VC4 in the next multiframe | ID#0 | ID#I | ID#2 | ID#3 | 0 | 0 | 1 | 1 |
| Last VC4 in the concatenation | ID#0 | ID#I | ID#2 | ID#3 | 1 | 1 | 1 | 1 |

The bits ID#0 to ID#3 permit the assignment of an identifier (ID) to the virtual concatenation. Those containers that belong together can be recognized by this identifier. If several virtual concatenations are transmitted within a multiplex structure, either the IDs must be different or the TTIs must be different.

The insertion or removal of the VC-4 can only take place at the beginning of a multiframe. That is, the indication becomes valid with the next multiframe number. A VC-4 can be inserted at any point. In the embodiment shown here, the "next TTI" field is coded according to the following rules and represents a pointer list:

Rule 1: The "next TTI" field of the last VC-4 carries the identifier of the first VC-4.

Rule 2: If a VC-4 is inserted in the virtual concatenation, the "next TTI" field points to the expanded TTI of the newly inserted VC-4.

Rule 3: If a new VC-4 is inserted after the currently last VC-4 in the virtual concatenation, the "next TTI" field of the currently last VC-4 points to the new TTI.

Rule 4: If a VC-4 is inserted before the currently first VC-4, the "next TTI" field of the last VC-4 points to the new first VC-4 and the currently first "next TTI" field points to the TTI of the currently second VC-4 of the virtual concatenation.

Rule 5: If a VC-4 is removed, the "next TTI" field of the preceding container points to the TTI of the VC-4 that follows the VC-4 that is being removed.

Rule 6: If the last VC-4 is removed, the "next TTI" field of the currently next to last container points to the first VC-4.

Rule 7: If the currently first VC-4 is removed, the "next TTI" field of the currently last VC-4 points to the currently second VC-4 of the virtual concatenation.

The network element according to the present invention relates to a network node which executes a conversion from contiguous concatenation to virtual concatenation or vice versa. In converting from virtual concatenation to contiguous concatenation, the H4 multiframes are evaluated and the bytes are incorporated in the structure of the contiguous concatenation according to the sequence defined in the "next TTI" field. Conversely, when converting from contiguous concatenation to virtual concatenation, the TTI can be freely defined, as has been true up to now, and a circuit to generate the H4 multiframe takes over the coding of the corresponding fields in the multiframe in the manner described above.

FIG. 2 shows the conversion from contiguous to virtual concatenation and back. The figure shows a first network element NE1 and a second network element NE2, which are linked via a synchronous information transmission network NET. Between the two network elements there are four VC4 connections, also referred to as paths. Each of these paths is represented by a virtual container of the VC-4 type. The four virtual containers that are exchanged between the two network elements are virtually concatenated, so that an entire payload of four times the VC-4 capacity can be transmitted. Both network elements have a path overhead processing circuit to generate the H4 multiframes, in which the received H4 bytes are evaluated and the H4 bytes to be sent are generated.

The first network element NE1 receives as input signal a frame-structured synchronous information signal which has a contiguous concatenation of the VC-4-4c type, i.e. in which four virtual containers in a multiplex structure of at least the size of a STM-4 are transmitted as a contiguous concatenation.

In the first network element, the path overhead of the first virtual container of the concatenation is evaluated. Since this is a contiguous concatenation, the path overhead of the remaining containers is ignored. The contiguous concatenation is then converted into a virtual concatenation, in that a TTI and a sequence number are assigned to each of the virtual containers. The TTI is written into the JI byte and the sequence number into a byte of the H4 multiframe. In addition the sequence number of the next container in the concatenation and a consecutive frame number are inserted as a pointer in the H4 multiframe. The virtual containers are then inserted into a respective STM-1 frame and at the corresponding interface equipment of the first network element are then sent as independent information signals via the information transmission network NET.

In the second network element NE2, the virtual concatenation is reconverted into a contiguous concatenation. To this end, the path overhead of the four incoming VC-4 virtual containers is evaluated and during this process the TTI in the J1 byte and the sequence number, frame number and pointer in the H4 multiframe are read. On the basis of this information, the received containers are sorted according to their sequence in the concatenation and are inserted in the correct order as a contiguous concatenation of the VC-4-4c type into a new multiplex structure of the STM-4 type. The latter is then sent as output signal at the output of the second network element NE2.

The first network element has a circuit arrangement for creating the virtual concatenation and a path overhead processing circuit for processing the path overhead of the virtual containers and for inserting the pointer that points to the next virtual container in the concatenation into the path overhead of the virtual container. These two circuits can be realized separately or as a common microprocessor-controlled circuit with the associated control software.

In addition to the path overhead processing circuit, the second network element also has a sort facility for sorting the sequence of the received virtual containers according to the sequence of the concatenation as determined by the sequence and frame numbers in the respective H4 multiframe of the received virtual containers. As in the first network element, these circuits can be realized either separately or as a common microprocessor-controlled circuit with the associated control software.

In the embodiment shown here, the invention has been described using the multiplex hierarchy and nomenclature of SDH. However, it can be applied analogously to other information transmission systems such as SONET. Although the present embodiment is limited to concatenations of virtual containers of the VC-4 type, the invention may be used in the same manner for other concatenation types, such as a concatenation of virtual containers of the VC-12 or the VC-11 type.

What is claimed is:

1. A method for the transmission of a payload via a synchronous information transmission network, wherein the payload is divided into blocks and the individual blocks are packed in virtual containers, each of which has a path overhead and a payload field, the individual virtual containers are concatenated to one another and the virtual containers are transported in at least one transport module, wherein a pointer that points to the next virtual container in the concatenation is inserted in the path overhead of all the virtual containers except the last virtual container in the concatenation.

2. A method as claimed in claim 1, in which a pointer that points to the first virtual container in the concatenation is inserted in the path overhead of each last virtual container in the concatenation.

3. A method as claimed in claim 1, in which a sequence number is inserted in the path overhead of all the virtual containers and in which in the pointer the sequence number of the next virtual container in the concatenation is inserted.

4. A method as claimed in claim 1, wherein in addition, a frame number is inserted in the path overhead of each virtual container.

5. A method as claimed in claim 1, wherein in addition, a first mark is inserted in the path overhead of the first virtual container in the concatenation of virtual containers.

6. A method as claimed in claim 1, wherein in addition, a second mark is inserted in the path overhead of the last virtual container of the concatenated virtual containers.

7. A method as claimed in claim 1, wherein information indicating that a further virtual container has been added to the concatenated virtual containers is inserted in the path overhead of at least one virtual container.

8. A method as claimed in claim 1, wherein information indicating that one of the concatenated virtual containers has been removed is inserted in the path overhead of at least one virtual container.

9. A method as claimed in claim 1, wherein a byte in the path overhead of the virtual containers is used for the insertions.

10. A network element for a synchronous information transmission network with a circuit arrangement for creating a virtual concatenation of virtual containers, each of which has a path overhead and a payload field and in which a payload signal is transported in blocks, and with at least one interface circuit for sending the individual virtual containers in the form of one or more frame-structured synchronous information signals, wherein a processing circuit for processing the path overhead of the virtual container and for inserting a pointer that points to the next virtual container in the concatenation into the path overhead of the virtual container.

11. A network element as claimed in claim 10, with a further interface circuit for receiving a frame-structured information signal that contains a number of contiguously concatenated virtual containers, with the circuit arrangement serving to convert the contiguous concatenation into a virtual concatenation of the virtual containers.

12. A network element as claimed in claim 10, which further comprises a sort facility for sorting the sequence of received virtual containers according to the sequence of the concatenation, as determined by the pointers in the path overhead of the virtual containers.

* * * * *